June 23, 1942. P. D. PHILLIPS 2,287,566
MOTOR OPERATED HORN
Filed March 27, 1941 2 Sheets-Sheet 2
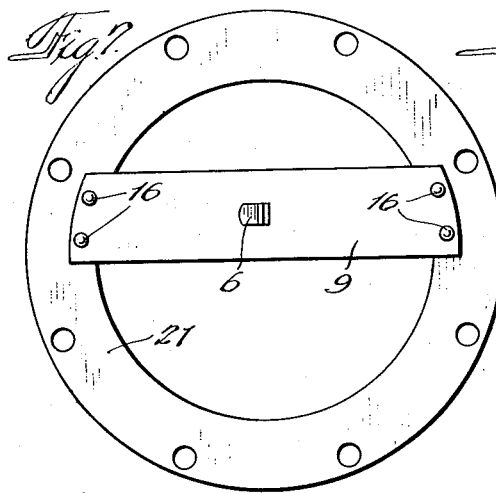
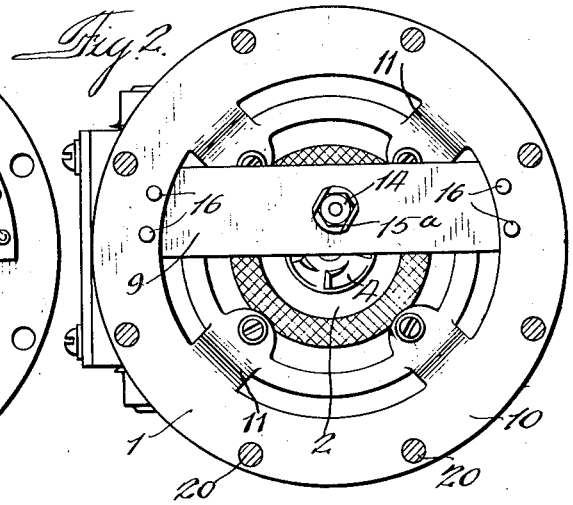
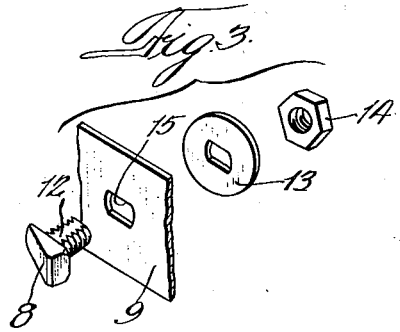
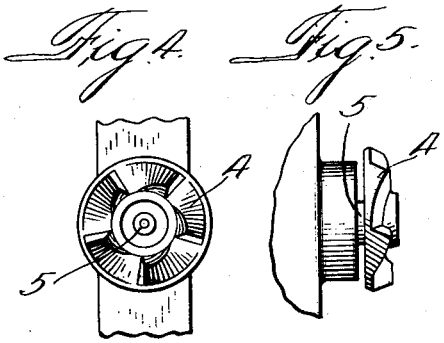
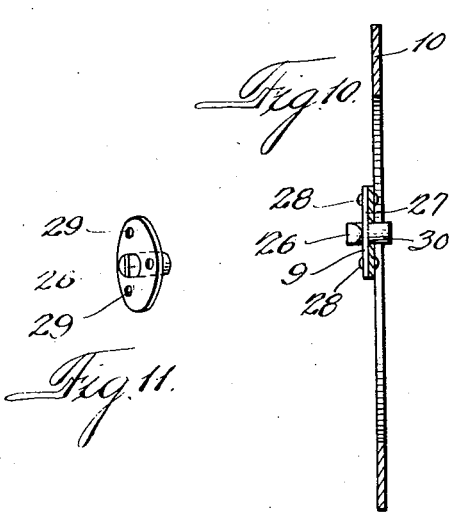
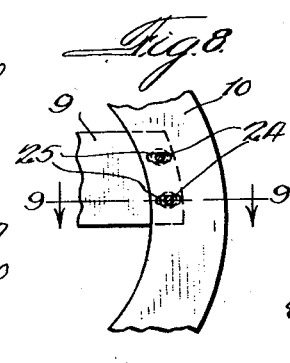
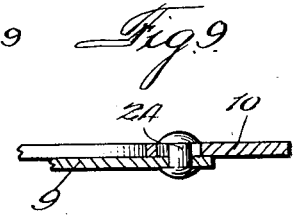
Inventor:
Paul D Phillips
By Thiess, Olsen & Mecklenburg
Attys Patented June 23, 1942

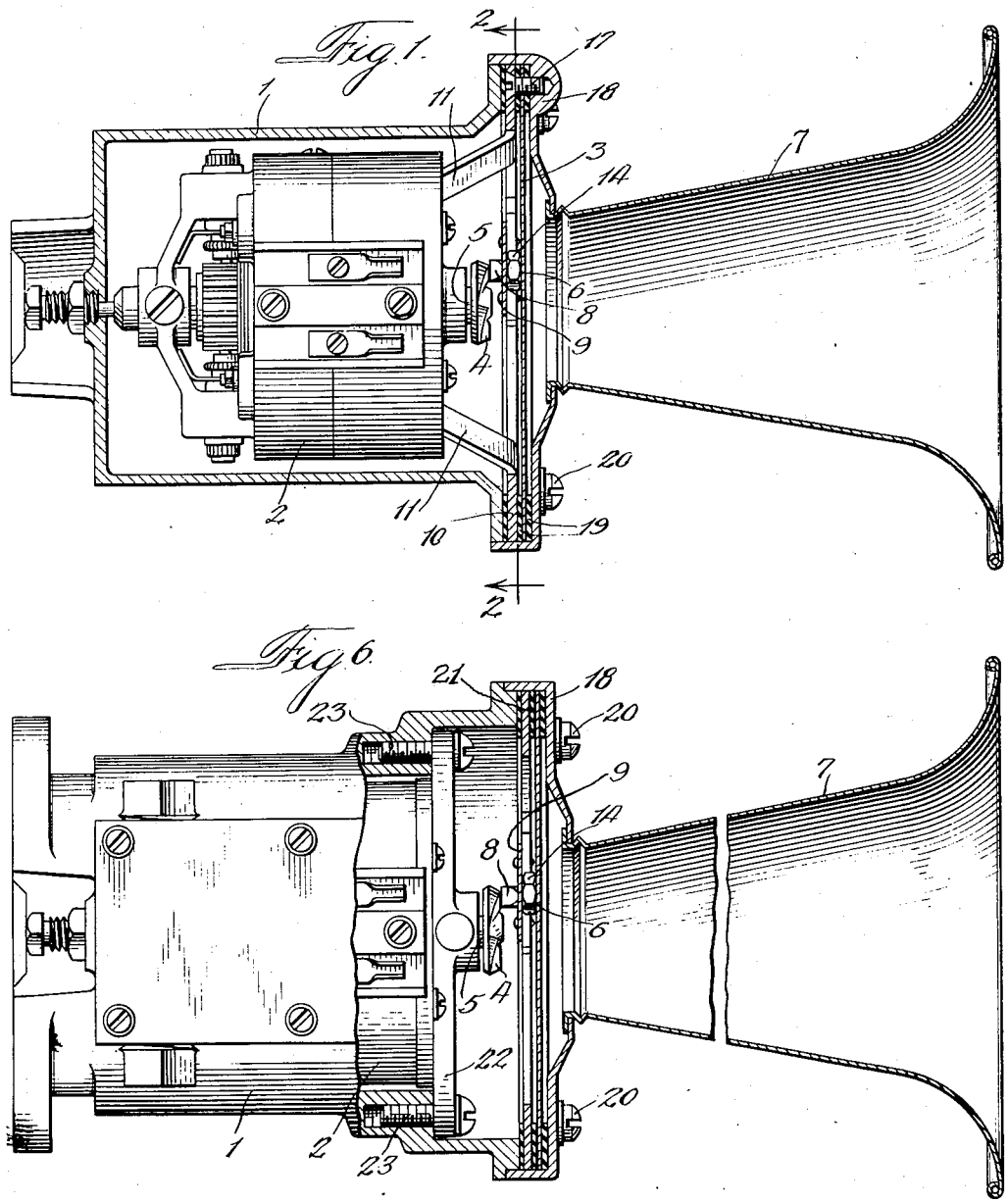

2,287,566

UNITED STATES PATENT OFFICE 2,287,566

MOTOR OPERATED HORN

Paul D. Phillips, Elmhurst, Ill., assignor to Benjamin Electric Mfg. Company, Des Plaines, Ill., a corporation of Illinois Application March 27, 1941, Serial No. 385,409

2 Claims. (Cl. 116—145)

My invention relates to motor operated horns. More specifically, it relates to motor operated horns of the type comprising a vibratable diaphragm, and a motor operated ratchet wheel, the teeth of which cause pressure to be exerted on the diaphragm to cause it to oscillate. In the prior art, it has been customary to provide for the actuation of the diaphragm by rigidly attaching a tooth or stud to the diaphragm at or near its central portion and to cause this tooth or stud, and the diaphragm to which it is secured, to oscillate by the successive engagement of the teeth of the ratchet with this stud. This results in a rapid rise and fall of the stud on the diaphragm with a consequent flexing of the diaphragm to which it is attached, thus setting up a wave motion in the air of the projector to produce a certain fixed tone or note.

With this construction the mechanical effect of the revolving ratchet on the tooth or stud is to push the stud forward or bend it over in the direction of movement of the ratchet teeth and also to shove the stud away from the ratchet teeth along a line parallel to the axis of the rotating ratchet. This results in a flexing of the entire free surface of the diaphragm and at the same time in a sharp bending in a small local area adjacent to the stud. As the diaphragm is made of thin spring steel tempered before blanking or piercing, the variable temper or hardness of the material and the composition in the steel itself results in great differences in durability of the diaphragm. The piercing of the diaphragm at or near its center for attaching the stud subjects the tempered stock of the diaphragm to considerable shock, starting fractures that increase in length and size as the diaphragm is flexed and finally result in complete fracture and failure of the diaphragm.

One of the objects of my invention is to eliminate this perforation of the diaphragm and disturbing of the grain structure of the diaphragm steel.

A further object of my invention is to prevent the combined flexing and bending of the diaphragm.

Further objects and advantages of the invention will be apparent from the description and claims.

In the drawings, in which several embodiments of my invention are shown:

Figure 1 is an axial section showing a motor operated horn;

Fig. 2 is a section substantially on the line 2—2 of Fig. 1;

Fig. 3 is an exploded perspective view showing the actuating stud and associated parts;

Fig. 4 is a face view of the motor driven ratchet wheel;

Fig. 5 is a side elevational view of the construction shown in Fig. 4;

Fig. 6 is a side elevational view showing another form of horn, parts being broken away;

Fig. 7 is a face view of the actuating stud and mounting therefor;

Fig. 8 is a detail view showing a modification of the mounting;

Fig. 9 is a sectional view on the line 9—9 of Fig. 8;

Fig. 10 is a sectional view showing another form of mounting for the stud; and

Fig. 11 is a perspective view of the stud of Fig. 10.

Referring to the drawings in detail, and first to Figs. 1-5, incl., the construction shown therein comprises a casing or housing 1, open at one end, an electric motor 2, mounted in said housing, a vibratable diaphragm 3 extending across the open end of the housing 1, a ratchet wheel 4 mounted on the motor shaft 5, a force-transmitting device 6 in the path of the teeth of the ratchet wheel 4 between the teeth and diaphragm 3 and oscillatably mounted independently of the diaphragm for transmitting force from the ratchet teeth to the diaphragm, and a projector horn 7 mounted in front of the diaphragm. The force-transmitting device includes a stud 8 secured to a spring mounting strip 9 which extends across the opening in the casing 1 in the rear of the diaphragm 3, the opposite ends of this strip being secured to the mounting ring 10 on which the motor is mounted. The motor is supported from the mounting ring by means of a plurality of legs 11 extending from the housing of the motor 2 to the mounting ring 10. The stud 8 may be secured to the mounting strip 9 in any suitable manner, as by providing the stud with a threaded shank 12 (Fig. 3) extending through an opening in the mounting strip, slipping a washer 13 over the end of the shank and screwing a nut 14 up on the shank to hold the stud securely in position. The shank may be flattened on opposite sides to conform to the shape of the slot 15 in the mounting strip 9 to prevent the stud from rotating on the strip. After the nut 14 is tightened up, the edge of the washer 13 may be bent up to engage one or more of the flat sides of the nut to prevent its unscrewing, as shown at 15a in Fig. 2. The mounting strip 9 extends in general tangentially to the path of movement of the teeth as they move in engagement with the stud 8, thus avoiding any force acting across the face of the mounting strip which would tend to flex the strip edgewise. The mounting strip 9 may be secured to the mounting ring 10 in any suitable manner, as by riveting or welding, as indicated at 16. The elasticity of the spring mounting strip 9 will permit the slight flexing occasioned by the movement of the ratchet teeth when in engagement with the sloping face of the stud. The mounting ring 10 and diaphragm 3 may be secured to the projector horn 7 by means of screws 17 extending through the mounting ring and diaphragm and threaded into the flange 18 of the projector. Suitable cushioning washers or gaskets 19 may be placed on opposite sides of the diaphragm 3. The complete assembly including the motor 2, diaphragm 3, and projector horn 7 may then be secured in place with respect to the housing 1 by means of screws 20 extending through the projector flange 18 and threaded into the housing 1.

The construction shown in Fig. 6 may be similar to that just described except that in Fig. 6 the spring mounting strip 9 is secured to a mounting ring 21 independently of the mounting ring 22 which carries the motor 2. This construction enables replacement to be made on motor horns now in use, since the diaphragm in use at present having the tooth or stud rigidly attached thereto may be removed and in place thereof may be substituted a plain unpierced diaphragm 3 and a mounting ring 21 carrying the spring mounting strip 9 and the actuating stud 8. The replacement also requires the use of one additional rubber gasket. In this form the motor 2 is secured in the housing 1 by means of screws 23 extending through the mounting ring 22 on the motor casing and threaded into the outside housing 1.

In Figs. 8 and 9 is shown a somewhat different form for mounting one end of the spring mounting strip 9 on the mounting ring 10. This construction enables a slight movement of this end of the mounting strip with respect to the mounting ring. The construction shown for this purpose comprises a pair of rivets 24 firmly secured to the spring mounting strip 9 and extending through slots 25 in the mounting ring. The rivets are secured in such a manner that they can have a slight movement in the slots in the mounting ring which may facilitate the flexing movement of the mounting strip under the action of the ratchet teeth.

In Figs. 10 and 11 is shown a somewhat different form of mounting the stud on the spring mounting strip. In this form the stud 26 is provided with an annular flange 27 which may be secured to the spring mounting strip 9 by means of rivets 28 extending through registering openings 29 in the flange and strip. The stud is provided with an extension 30 which engages the diaphragm 9 to cause it to vibrate. It should be noted that the studs 8 and 26 which act as pushers rather than hammers in effecting the vibrating movement of the diaphragms are always in direct contact with the diaphragm and in this respect differ from the hammer effect of an oscillating armature in the ordinary vibrator type of horn. Since the stud is thus supported in such a way that it always bears directly against the diaphragm and since it is spring supported, the vibratory movement of the diaphragm is synchronous with the motion of the stud and therefore the vibration period is the same as that where the stud is rigidly attached to the diaphragm. The entire area of the diaphragm is free to flex and its grain structure is not disturbed, either by making the perforation by a perforating die or by the twisting and heating action of a rotating drill, or by the abuse incidental to the riveting of the stud to the diaphragm. The spring mounting strip 9 which carries the stud is of spring stock, not necessarily of tempered steel but preferably of some tough material possessing high spring qualities and capable of withstanding long continued periods of flexing, such, for example, as beryllium copper. Since a comparatively narrow strip, either rigidly secured at each end or rigidly secured at one end and with a limited amount of slip at the other, is used, the flexing of this strip is distributed across the entire width of the strip and the tearing action which would be expected where the stud is secured in the center of a large surface area is avoided.

Further modifications will be apparent to those skilled in the art and it is desired, therefore, that the invention be limited only by the scope of the appended claims.

Having thus described my invention, what I claim and desire to secure by Letters Patent is:

1. A motor operated horn comprising a vibratable diaphragm, a motor operated ratchet wheel, and a force transmitting member in the path of the teeth of the ratchet wheel between the teeth and diaphragm for transmitting force from the ratchet teeth to the diaphragm, and means for oscillatably mounting said force transmitting member independently of said diaphragm comprising an elongated substantially straight spring having its center line extending in general tangentially to the circumference of the circular path of movement of the ratchet teeth as they move in engagement with said transmitting member.

2. A motor operated horn comprising an open-ended housing, a vibratable diaphragm extending across said open end, a projector horn mounted in front of said diaphragm, a motor in said housing having a shaft extending in a direction such that its axis intersects the plane of the diaphragm, a ratchet wheel mounted on the motor shaft adjacent said diaphragm, a substantially straight mounting strip extending across said opening between the ratchet wheel and diaphragm, and a force transmitting member mounted on said strip in the path of the ratchet teeth for transmitting force from the ratchet teeth to the diaphragm, said mounting strip having its center line extending in general tangentially to the circumference of the circular path of movement of the teeth as they move in engagement with said force transmitting member.

PAUL D. PHILLIPS.